Figure 1:
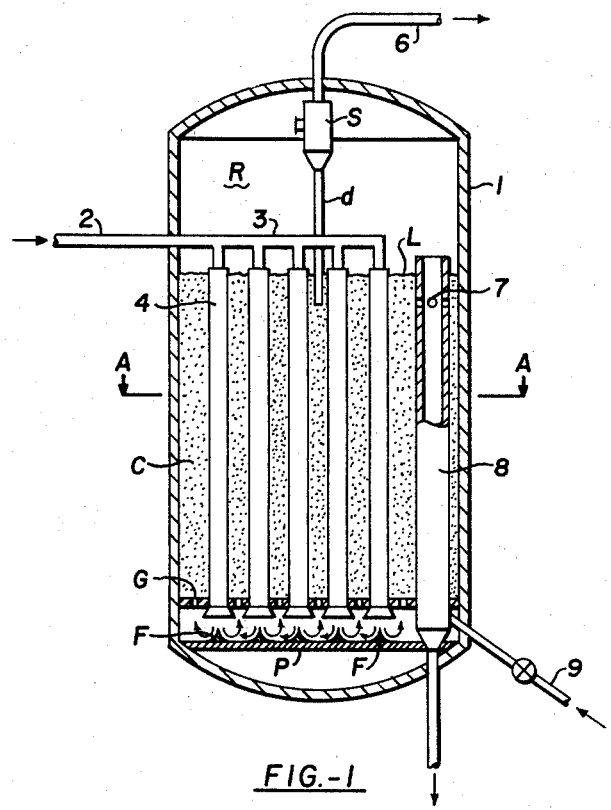

Oct. 27, 1959 R. W. SAGE ET AL 2,910,431
HYDROFORMING AND APPARATUS THEREFOR
Filed July 20, 1956

Richard W. Sage
Donald D. MacLaren      Inventors

By J. Cushman  Attorney

United States Patent Office 2,910,431
Patented Oct. 27, 1959

2,910,431

HYDROFORMING AND APPARATUS THEREFOR

Richard W. Sage, Fanwood, and Donald D. MacLaren, Scotch Plains, N.J., assignors to Esso Research and Engineering Company, a corporation of Delaware Application July 20, 1956, Serial No. 599,058

11 Claims. (Cl. 208—159)

The present invention relates to improvements in catalytic chemical reactions such as hydroforming and to a reactor especially adapted for use in such reactions which employ a fluidized bed of catalytic material.

Heretofore and prior to the present invention others have proposed apparatus and, in particular, reactor designs especially adapted for carrying out chemical reactions in the presence of a fluidized bed of catalyst. As is known in this type of reaction, a reactor vessel is charged with powdered catalyst and gasiform material is caused to flow up through the bed of catalyst at a flow velocity sufficient to maintain the bed of catalyst in a dense phase fluidized turbulent mass. It was found in the early development of this fluidized catalyst technique that good contact between gasiform material and the catalytic material and efficient heat supply in endothermic chemical reactions were not always attainable. In other words, the formation of large gas bubbles, slugging of the catalyst, channeling of the gasiform material through the bed and other undesirable phenomena prevented efficient operation and as a result it was often found impossible to operate the reactor at designed capacity. This is particularly true in the case of large commercial reactors having say a diameter of 15 feet or more. In the case of hydroforming of naphthas, efficient heat supply proved to be a difficult problem.

The present invention provides means for improving the operation of a reactor containing a fluidized bed of catalyst, which means are adapted to provide good contact between gasiform material and catalytic particles and to minimize or prevent formation of large gas bubbles, balls or slugs of catalyst, channeling and otherwise insure smooth operation.

The present invention also achieves an improved heat transfer means between the incoming gasiform reactants and the fluidized bed in such a way as to increase the heat available for endothermic reactions without an attendant increase in undesirable thermal reactions.

The present improvements will be described in connection with hydroforming, utilizing a fluidized bed of catalyst with the understanding that the improvements are adapted for use in connection with a fluidized catalyst technique broadly.

The main object of the present invention is to provide a reactor construction or design for use in connection with catalytic conversions or reactions wherein a gasiform material is contacted with a fluidized bed of a catalyst under reaction conditions to insure smooth and efficient operation.

Another object of the present invention is to modify structurally a conventional reactor adapted for carrying out reactions in the presence of a fluidized bed of catalyst to improve its operation, by means which are relatively simple and inexpensive.

A specific object of the present invention is to modify a hydroforming reactor to include a relatively simple and inexpensive apparatus which will cause the hydroforming operation to proceed smoothly by substantially eliminating premature thermal cracking of the feed and backmixing of catalyst in the fluidized bed while promoting efficient contact between reactants and catalysts.

A further object of the present invention is to provide a method of operating a chemical conversion or reaction process carried out in the presence of a fluidized bed of catalyst under reaction conditions in such a manner as to prevent backmixing in the bed of catalyst and degradation of feed stock and to insure good distribution of vaporiform material throughout the bed of catalyst, and otherwise improve the operation.

Other and further objects of the invention will appear from the following more detailed description and claims.

In brief compass, the present invention provides a mechanical means and operating technique for improving the operation of a chemical process, utilizing a fluidized bed of catalytic material by causing the feed stock to flow downwardly through a plurality of tubes from the top of the bed of catalyst to a point below the bottom of said bed and thereafter permitting the reacting material to escape from the lower ends of the tubes and to pass upwardly through the bed of catalyst wherein the desired reaction occurs. In the case where the reaction involves the hydroforming of naphthas, the preheated naphtha feed and the recycled hydrogen gas are preheated and charged to a manifold positioned above or in the top of the fluidized bed of catalyst and thereafter the preheated material is caused to flow downwardly through a plurality of vertical tubes disposed in the fluidized bed of catalyst. The passage of gas through the tubes in the case of hydroforming results in transfer of heat from the charged material to the bed of catalyst thus reducing the tendency of the naphtha to undergo thermal cracking without decreasing the heat made available to the bed from the reactants which are heated to a level above bed temperature. The time in which the naphtha is resident in the said manifold and vertical tubes is very short, being of the order of 0.4 to 0.5 second. This residence time in the said manifold and tubes is short enough to prevent significant thermal cracking even though the feed is well above the thermal cracking temperatures. Transfer of heat from the feed and recycle gas to the bed during their passage through the tubes is important. Without cooling of the gases excessive thermal cracking would occur in the zone below the bed. By cooling the gases in the tubes this cracking is largely eliminated without loss in total heat transferred to the bed.

The matter of supplying heat to the highly endothermic reaction of hydroforming is a basic problem. Current practice has involved preheating the naphtha feed and the recycle hydrogen-containing gas to temperatures causing at least some cracking of the oil feed stock in the preheating furnaces or other heating means. This excessive heating results in a loss of about 2 volume percent of $C_{5+}$ gasoline based on feed. This amounts to a loss of about $2000.00 per day in a plant having a capacity of say 20,000 barrels per day.

The aforementioned device and method of effecting a reduction in thermal cracking attainable by the practice of this invention permits the use of a single pierced plate or grid as a gas and vapor distributing means and avoids the necessity of utilizing complicated and expensive gas distributing means such as a plurality of "porcupine" or finger gas and vapor distributors. Also, as indicated, the disposition of the vertical tubes in the bed of catalyst tends to prevent slugging of the catalyst and the formation of large gas bubbles, thus insuring intimate contact between reactants and catalyst and otherwise improving the operation.

Figure 2:
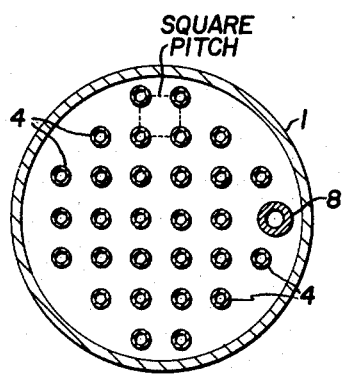
Figure 3:
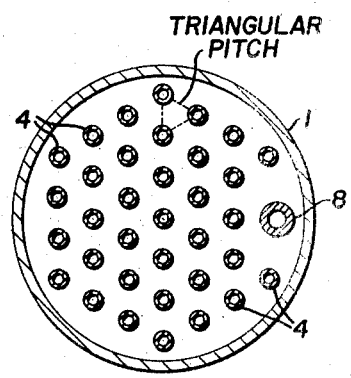

In the accompanying drawing there is indicated in Fig. 1 the improved reactor design and such accessory apparatus as is necessary to illustrate the invention; in Fig. 2 there is depicted a horizontal section taken through line A—A of Fig. 1, showing the arrangement of tubes in square pitch through which the oil feed and hydrogen pass downwardly in heat exchange relationship with a fluidized bed of catalyst; and, in Fig. 3 the tubes are shown in triangular pitch arrangement.

Referring in detail to the drawings, 1 represents a conventional reactor, which is in the form of a vertical vessel, cylindrical in shape, having round end portions. A mixture of naphtha feed and recycled hydrogen-containing gas preheated by conventional means (not shown) enters the reactor at an upper point through a transfer line 2 and thereafter passes to a manifold 3 in communication with a plurality of downwardly extending tubes 4 disposed apart in a fluidized bed of catalytic material C, having an upper dense phase level at L, the bed of catalyst C, being supported on a gas distribution means G comprising a pierced plate or grid or other perforate member. The feed and recycle gas pass downwardly through the tubes to a chamber below G, the grid G and a solid or imperforate horizontal plate P and the reactor side walls forming said chamber. The plate P carries deflectors F and these serve to direct the feed and recycle gas upwardly through the catalyst bed C so that they are uniformly distributed throughout the bed. The lower ends of the tubes 4 are flared to permit a reduction in the gas velocity as the gasiform or vaporiform material passes from the said tubes. Deflectors F are disposed in alignment with the tube ends and assist in effecting good gasiform distribution in the bed C. The said tubes, as shown in Fig. 2, are disposed in the fluidized bed of catalyst in such a manner as to define either a square or a triangular area referred to respectively as a square or triangular pitch. Assuming that the diameter of reactor 1 is 21.5 feet and the tubes have an external diameter of 1½ inches, the tubes are disposed in the manner indicated in Fig. 2, the spacing of the tubes being about 1.9 feet from center to center. Streams of gasiform material pass from the tubes and then pass upwardly through the pierced plate or grid G through an area defined by four tubes, the plate G carrying spaced perforations to accommodate this flow.

During passage of reactants through the bed of catalyst the desired conversion occurs and the raw product passes from the dense fluidized bed of catalyst into a catalyst disengaging space R positioned between L and the top of the reactor in which space the main bulk of the catalyst is separated from the product and descends toward the bed of catalyst C by gravity. Before the product is withdrawn from the reactor, it is caused to flow through gas-solids separating devices S wherein entrained catalyst is separated from the product and returned to the bed of catalyst C through one or more dip pipes $d$. The product is thereafter withdrawn from the reactor through line 6 and delivered to apparatus (not shown) wherein it is cooled sufficiently to condense normally liquid products and thereafter subjected to such other and further refining by conventional methods as is necessary to obtain the desired product. In the treatment of the raw product to furnish the finished material, hydrogen is recovered and recycled to the reaction zone with fresh feed stock.

Referring again to reactor 1 there comes a time when the catalyst becomes deactivated due to the formation or deposition thereon of carbonaceous and other deposits and to reactivate the catalyst it is subjected to oxidative regeneration in a conventional regenerator (not shown). Before the catalyst is regenerated it is subjected to the influence of a stripping gas, such as steam, in an inside stripper 8, the catalyst entering the stripper at an upper point through ports 7 and thereafter passing downwardly against the upwardly flowing stripping gas which may be charged to the stripper through valved line 9. The purpose of the stripping, of course, is to remove volatile material adsorbed or occluded by the catalytic material and this stripped material containing volatile hydrocarbons is withdrawn from an upper point in the stripper which is located above the dense phase level L of the bed of catalyst and is admixed with the raw product and the mixture subjected to treatment in the manner previously indicated. The stripped deactivated catalyst is, as is well known in the art, withdrawn from the bottom of the stripper 8, transferred to a separate regenerator vessel where inactivating deposits are burned off whereupon the regenerated catalyst is stripped of combustion gases and returned to the catalyst bed C in reactor vessel 1 with or without contact with activation gases.

In order more fully to explain the present invention and the results attainable by practicing the same the following example is set forth with the understanding that it is merely illustrative of the invention and it does not impose any limitation thereon.

EXAMPLE

*Reactor dimensions*

Diameter of reactor, ft. _____ 21.5.
External diameter of tubes 4, in. _____ 1.90 (1½ pipe).
Number of tubes in reactor ___ 121 [1].
Spacing of tubes (in feet) ____ 1.9 [1] on centers (square pitch) (see Fig. 2).
Length of tubes, ft. _____ 35–40.

*Conditions in reactor 1*

Catalyst composition _____ 10% $MoO_3$ on 90% $Al_2O_3$ by wt.
Inlet temperature of $H_2$ and naphtha material, ° F. _____ 1090.
Temperature of feed exiting from tubes 4, ° F. _____ 1050.
Av. temperature of catalyst bed (C), ° F. _____ 920.
Travel time of feed through pipe 2,[2] manifold 3 and tubes 4, seconds _____ 0.4–0.5.
Pressure above catalyst bed, p.s.i.g. _____ 200.
Reactant and $H_2$ velocity in catalyst bed, ft./second ____ 0.8–1.2.
Pressure drop through plate G_ 0.5–1.5 p.s.i.g.

[1] These figures will vary depending on the size of the reactor.
[2] The travel time of the naphtha from the furnace to the reactor inlet is from about 0.2 to 0.5 second.

*Test runs*

In order to show the utility of the present invention there is set forth below under column A results obtainable by utilizing the present invention and in B an operation carried out on the same feed stock under the same conditions of temperature, pressure, residence time in the catalytic hydroforming fluid bed except that the present improved method involving the use of tubes 4 is omitted and the feed was introduced at the bottom of the bed through a conventional distributor. The feed stock treated in both runs has the following inspection: a virgin naphtha having a boiling range of from 200°–375° F., containing 43 vol. percent naphthenes, 45 vol. percent paraffins, 12 vol. percent aromatics, 0.03 wt. percent sulfur, 46 Research clear octane number, and a Watson K factor of 11.90.

|  | Column A | Column B |
| --- | --- | --- |
| Reactor Conditions: |  |  |
| Temperature, ° F | 920 | 920 |
| Pressure, p.s.i.g. | 200 | 200 |
| Weight hourly space vel., W./hr./W | 0.32 | 0.32 |
| Catalyst/oil ratio | 1.2 | 1.2 |
| Hydrogen/oil molal ratio | 5.0 | 5.0 |
| Products: |  |  |
| $C_5$+Res. Oct. No., clear | 95 | 90 |
| $C_5$+Yield, vol. percent on fresh feed | 76 | 79 |
| $C_5$+Yield at 95 R.O.N | 76 | 74 |
| Relative Bed Efficiency, percent | 100 | 60 |

The Watson K factor mentioned above is a means of characterizing a feed stock, for instance, to determine its paraffin content. A Watson K factor of 11.90 indicates a good hydroforming feed stock.

In the foregoing example it can be seen that the improvement in efficiency by practicing the present invention is reflected in the increase of the Research octane number of the $C_{5+}$ product.

The example shows an improvement in efficiency of operation amounting to 40%. This improvement in operation efficiency is brought about by the baffle means provided by the tube arrangement in the bed and the manner in which heat is transferred through the tubes from the feed to the bed, and the relatively short time at which the feed is at thermal cracking temperatures.

Numerous modifications of the present invention may be made by those familiar with the present art without departing from the spirit thereof.

What is claimed is:

1. An apparatus of the character described comprising in combination a vertical vessel adapted to contain a fluidized bed of catalytic material, a foraminous member disposed in a lower portion of said vessel adapted to support said fluidized bed, an intake manifold disposed in an upper portion of said vessel, a feed pipe in communication with said manifold for introducing gaseous reactants into said vessel, a plurality of downwardly extending horizontally spaced tubes in communication at their upper ends with said manifold, said tubes extending to a point in the vessel below the said foraminous member, ports or perforations so disposed in said foraminous member to permit flow of said reactants upwardly through the spaces around said tubes and means for withdrawing product from said vessel.

2. An apparatus for carrying out chemical reactions in the presence of a bed of fluidized solids comprising a vertical vessel adapted to contain a dense fluidized bed of powdered solids, fluid reactant inlet means for introducing a gasiform reactant into a feed intake manifold disposed in the upper portion of said vessel, a support for said bed of solids comprising a perforate member disposed at a lower point in said vessel, a plurality of spaced tubes extending downwardly through said vessel from said feed intake manifold to points below said perforate member, an imperforate plate disposed in said vessel below said perforate member forming a chamber with said perforate means and adapted to direct gaseous reactant material upwardly through the perforate member into the spaces around said tubes and conduit means for withdrawing product from said vessel.

3. An apparatus of the character described comprising an enclosed, elongated, vertically disposed reaction vessel, said vessel having a grid disposed in subtantially transverse relation to the longitudinal axis of said vessel in the lower portion thereof and in spaced relation to the bottom wall of said vessel, an imperforate plate within said vessel intermediate said lower wall and said grid and plate defining between them a distribution chamber, a plurality of elongated tubes disposed within said vessel in substantially coextensive parallel relation therewith and with each other, said conduits each having an upper end and a lower end extended through said grid into communication with said chamber therebelow, a manifold interconnecting the upper ends of said tubes, an intake conduit extended into said vessel through a wall thereof into communication with said manifold and conduit means for withdrawing product from said vessel.

4. The apparatus of claim 1 adapted to receive a fluidized bed of catalyst in the spaces surrounding said tubes, the said tubes being flared at their lower ends thus affording a velocity reduction in the gaseous reactant material escaping from said tubes, and a solid plate carrying deflectors adapted to direct said gaseous reactant material upwardly into the spaces surrounding the tubes so as to effect substantially uniform distribution of the said gaseous reactant material in the said spaces containing catalyst.

5. The apparatus of claim 2 in which the said tubes are flared at their lower ends thus affording a reduction in velocity in the gaseous reactant material escaping from said tubes, and a plurality of deflectors carried on said solid plate in proximity to said lower ends of said tubes adapted to effect uniform distribution of said gaseous reactant in the said spaces containing catalyst.

6. In the hydroforming of naphtha in the presence of a hydroforming catalyst under hydroforming conditions of temperature, pressure and reaction time, the improvement which comprises introducing a naphtha and hydrogen, preheated to thermal cracking temperatures, into a hydroforming zone, causing the said naphtha to pass rapidly in the form of a plurality of confined streams through a bed of fluidized hydroforming catalyst in indirect heat exchange relationship with said bed whereby the said naphtha and hydrogen are cooled and the bed of catalyst acquires heat, withdrawing said cooled naphtha and hydrogen from said streams and charging them into a space below said bed, causing the said naphtha and hydrogen to flow upwardly through said bed of catalyst and recovering hydroformed naphtha for product from said reaction zone.

7. The method of claim 6 in which the said confined streams are disposed in square pitch arrangement in said bed of catalyst.

8. The method of claim 6 in which the said confined streams are disposed in triangular pitch arrangement in said bed of catalyst.

9. The method of claim 6 in which the travel time of the confined streams of naphtha and hydrogen through the bed of catalyst is from 0.4–0.5 second.

10. In the hydroforming of naphtha in the presence of a hydroforming catalyst under hydroforming conditions of temperature, pressure and reaction time, the improvement which comprises introducing a naphtha and hydrogen, preheated to thermal cracking temperatures, into a hydroforming zone, causing the said naphtha to pass rapidly in the form of a plurality of confined streams through a bed of fluidized hydroforming catalyst in indirect heat exchange relationship with said bed whereby the said naphtha and hydrogen are cooled and the bed of catalyst acquires heat, the said confined streams being so disposed and arranged as to effect baffling of the bed thus minimizing backmixing of catalyst, the formation of catalyst slugs and enlarged gas bubbles, withdrawing said cooled naphtha and hydrogen from said streams and charging them into a space below said bed, causing the said naphtha and hydrogen to flow upwardly through said bed of catalyst and recovering hydroformed naphtha for product from said reaction zone.

11. The method of claim 6 in which the withdrawn naphtha and hydrogen are substantially uniformly distributed through the space in the reaction zone below said catalyst bed by flow directing means.

References Cited in the file of this patent
UNITED STATES PATENTS

| | | |
|---|---|---|
| 2,284,603 | Belchetz et al. | May 26, 1942 |
| 2,549,570 | Vance | Mar. 27, 1951 |
| 2,647,738 | Trainer | Aug. 4, 1953 |
| 2,805,144 | Stotler | Sept. 3, 1957 |